Dec. 19, 1961  K. C. YORK  3,013,524
SHOCK OVERLOAD INDICATOR
Filed July 13, 1959  3 Sheets-Sheet 1

INVENTOR.
KENNETH C. YORK
BY
Hraleer J. Jason
ATTORNEY

Dec. 19, 1961  K. C. YORK  3,013,524
SHOCK OVERLOAD INDICATOR
Filed July 13, 1959  3 Sheets-Sheet 2
FIG. 11
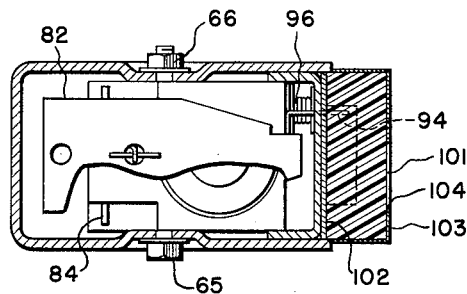
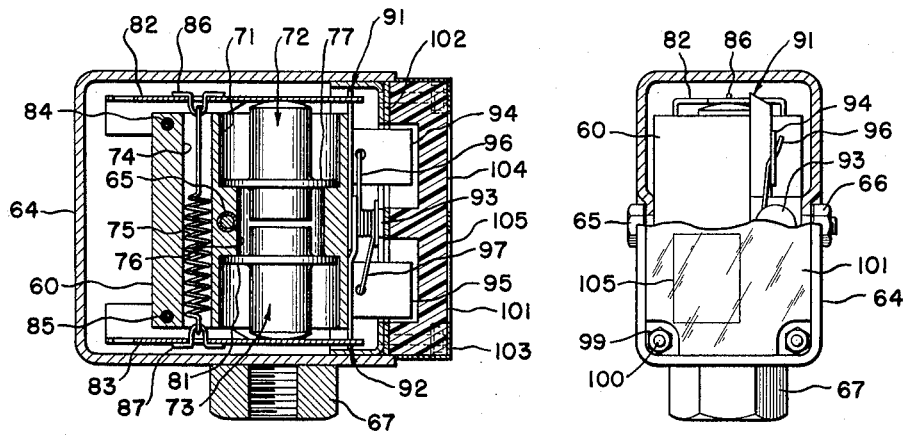
FIG. 9  FIG. 10
INVENTOR.
KENNETH C. YORK
BY
Walter J. Jason
ATTORNEY Dec. 19, 1961  K. C. YORK  3,013,524
SHOCK OVERLOAD INDICATOR
Filed July 13, 1959  3 Sheets-Sheet 3
FIG. 14
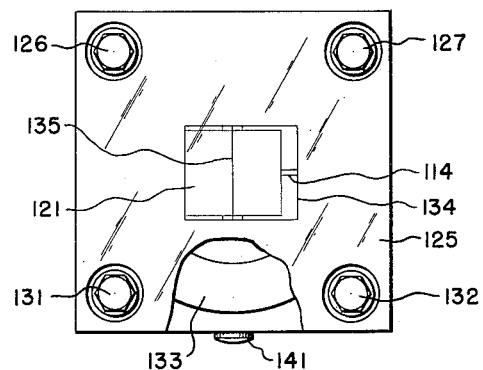
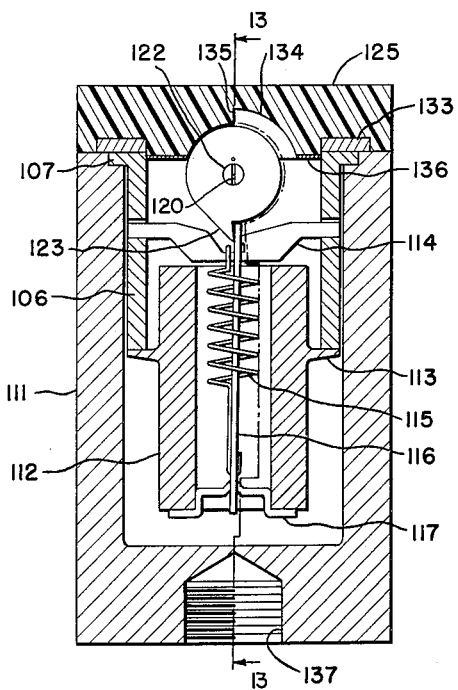
FIG. 12
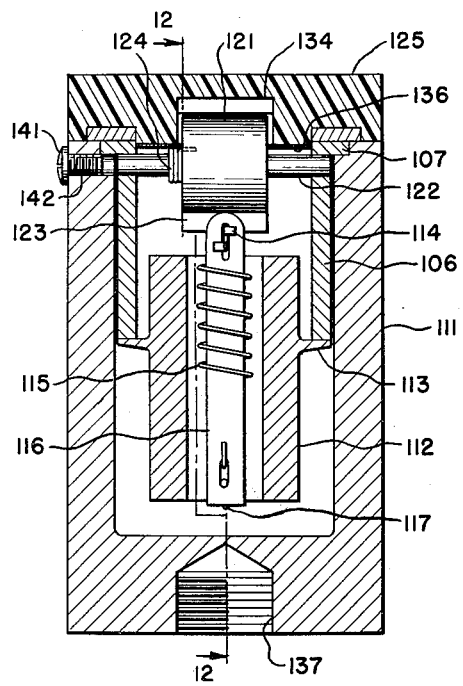
FIG. 13
*INVENTOR.*
KENNETH C. YORK
BY
Walter J. Jason
*ATTORNEY*

United States Patent Office 3,013,524
Patented Dec. 19, 1961

3,013,524
SHOCK OVERLOAD INDICATOR
Kenneth C. York, Pomona, Calif., assignor to General Dynamics Corporation, San Diego, Calif., a corporation of Delaware
Filed July 13, 1959, Ser. No. 826,506
23 Claims. (Cl. 116—114)

This invention relates to shock indicators, and more particularly to shock indicators suitable for inclusion in a shipping container to indicate subjection of the contents of the container to excessive shock.

Complex delicate scientific instruments, fragile glassware and ceramics, and numerous other valuable commodities may be readily damaged by careless handling during shipment. Such damage may not be apparent to cursory inspection upon receipt, although the shipment may have been rendered unsuitable for its intended use. A suitable shock indicator included in the shipping container will, however, positively indicate subjection of the shipment to excessive shock. By including an easily readable visual indicator on the shock indicator, and providing a transparent window or hatch in the shipping container, an inspector may determine the condition of the shipment without opening the container.

The shock indicator contemplated by the present invention is a simple mechanical device adapted to be tripped when subject to acceleration over a predetermined level. A seismic mass and a visual indicator are resiliently restrained, but adapted to respond to a predetermined shock level. Upon application of a shock acceleration above a level predetermined by the configuration of the device, movement of the seismic mass releases the visual indicator to its actuated position. The shock indicator of the present invention may readily be reused by simply resetting the indicator unit.

It is, therefore, an object of this invention to provide a shock indicator suitable for inclusion in a shipping container.

Another object of this invention is to provide a shock indicator adapted to indicate subjection thereof to acceleration above a predetermined level.

Another object of this invention is to provide a reliable, rugged, simple, inexpensive to manufacture, reuseable shock indicator.

These and other objects and features will become more apparent by reference to the following description taken in conjunction with the accompanying drawings, wherein:

FIGURE 9 is a side view partially cut away, of an omnidirectional shock indicator in accordance with this invention;

FIGURE 10 is an end view partially cut away of the embodiment of FIGURE 9;

FIGURE 11 is a top view partially cut away of the embodiment of FIGURE 9;

FIGURE 12 is a cross-sectional view taken along 12—12 in FIGURE 13 of one side of another embodiment of this invention;

FIGURE 13 is another cross-sectional view taken along 13—13 in FIGURE 12 of the embodiment of FIGURE 12; and FIGURE 14 is a top view of the embodiment of FIGURE 12.

Figure 1:
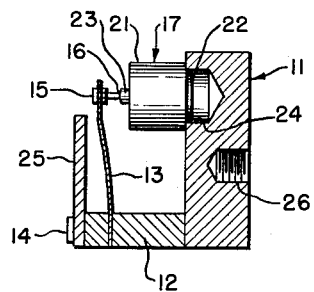
FIGURE 1 is a cross-sectional view of a first embodiment of this invention taken along 1—1 in FIGURE 2.
Figure 2:
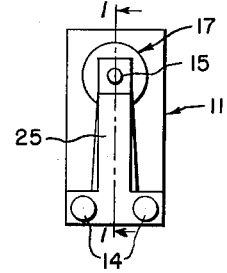
FIGURE 2 is a top view of the embodiment of FIGURE 1.

Referring now to FIGURES 1 and 2, a first embodiment of the shock indicator of the present invention includes a rigid base 11. A buttress 12, rigidly fastened to base 11, supports a leaf spring 13, which is screwed or otherwise securely fastened thereto, as by screws 14. A bearing pin 15 is securely fastened to the end of leaf spring 13 opposite buttress 12. Bearing pin 15 is furnished with a rounded bearing surface 16. Bearing surface 16 is urged against a seismic mass 17 by leaf spring 13. Mass 17 includes a large diameter cylindrical portion 21, a smaller diameter cylindrical portion 22 integral and coaxial with large cylindrical portion 21, and a rod 23 on the end of cylinder 21 opposite cylinder 22, also integral and coaxial with large diameter cylinder 21. The end of rod 23 is flat and polished, with rounded edges about the circumference. A circular recess 24 is provided in base 11, adapted to receive small diameter cylindrical portion 22 of seismic mass 17. Recess 24 is large enough to provide a free fit for small diameter cylinder 22. A stop 25 is provided to prevent excessive deflection of spring 13.

Small diameter cylinder portion 22 of seismic mass 17 is seated in recess 24. Spring 13 urges bearing surface 16 of bearing pin 15 against the flat end of rod portion 23 of seismic mass 17, thereby supporting seismic mass 17 in seated position in recess 24.

The embodiment of this invention illustrated by FIGURES 1 and 2 is responsive to shock applied to the base in the hemisphere surrounding seismic mass 17. Base 11 is secured to the shipment in the shipping container in a suitable manner, as by a screw mating with internally threaded aperture 26. Two units mounted on opposite sides of the shipment, may be employed for indication of applied shock over an entire sphere. Normally, however, only one unit mounted on the bottom and providing indication of excessive side shocks or dripping of the container will be necessary.

Upon application of shock acceleration to the indicator illustrated in FIGURES 1 and 2, a moment is applied to the seismic mass 17 equal to the acceleration multiplied by the mass of seismic mass 17 and the distance from base 11 to the center of gravity of the seismic mass 17. The shock-induced moment is opposed by the force exerted by spring 13 multiplied by the radius of mass 17, plus the frictional force between bearing surface 16 and the end of rod 23 multiplied by the distance between the end of rod 23 and base 11. When the shock-induced moment exceeds the opposing locking moment, mass 17 will rock about one edge of seating aperture 24. As mass 17 rocks, the longitudinal moment arm between the center of gravity of mass 17 and the pivot point of mass 17 about base 11 increases. This moment arm increase is compensated for by an increase in force exerted by spring 13 as it is deflected, and by an increase in frictional force between the flat end surface of rod 23 and the rounded bearing surface 16 of bearing pin 15. If the acceleration due to the applied shock exceeds the predetermined limit, rod 23 of mass 17 will slide clear of pin 15, and mass 17 will be released to fall free into a suitable transparent container, not shown, enclosing the shock indicator. The shock indicator of FIGURES 1 and 2 is reset for further use by deflecting spring 13 toward stop 25, seating mass 17 in aperture 24 in base 11, and releasing spring 13 to allow bearing pin 15 to contact the flat surface of rod portion 23 of mass 17.

Figure 5:
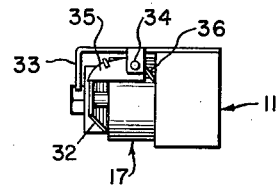
FIGURE 5 is an end view of the embodiment of FIGURE 3.
Figure 4:
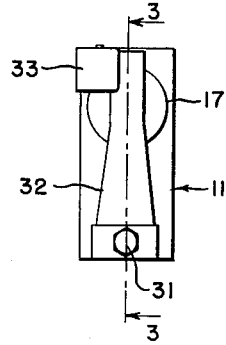
FIGURE 4 is a top view of the embodiment of FIGURE 3.
Figure 3:
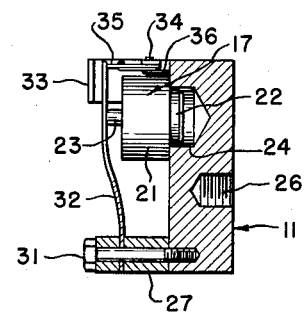
FIGURE 3 is a cross-sectional view of another embodiment of this invention taken along 3—3 in FIGURE 4.

A modification of the present invention wherein motion of the seismic mass under shock releases an indicating flag, while the mass remains in place is illustrated in FIGURES 3, 4 and 5. Base 11, having recess 24 for seating seismic mass 17, and internally threaded mounting recess 26 is similar to base 11 in the embodiment of FIGURES 1 and 2. Similarly, seismic mass 17, having large diameter cylinder portion 21, smaller diameter cylinder portion 22, and rod portion 23 are substantially identical to the like parts in the embodiment of FIGURES 1 and 2. Spring support buttress 27 is rigidly fastened to base 11, as by machine screw 31. A leaf spring 32, having one end fastened to, and supported by, buttress 27, provides a force urging smaller diameter cylinder section 22 of seismic mass 17 into seating recess 24 in base 11. The surface of spring 32 is parallel to base 11 in the area of contact with rod portion 23 of mass 17. Stop 33, fastened to base 11, is provided to prevent overstressing of spring 32, and to provide a bearing for pin 34, connected to elongated indicating signal flag 35, fabricated of a suitable stiff, sheet material. Signal flag 35 is rotatably fastened at one end to stop 33 by pin 34, rotating about an axis parallel to base 11 and leaf spring 32. The free end of signal flag 35 is urged to rotate toward base 11 by a torsion spring 36. Normally, however, signal flag 35 is restrained against the urging of torsion spring 36 by leaf spring 32 obstructing the free end thereof.

Application of a shock in excess of a predetermined value to the upper hemisphere releases indicating signal flag 35, allowing torsion spring 36 to rotate signal flag 35 to rest against base 11. A shock vector parallel to base 11 causes mass 17 to rotate about a point on the edge of aperture 24, increasing the distance between the end of rod portion 23 in contact with spring 32 and base 11. Thus, the clearance between spring 32 and the base is increased, lifting the free end of spring 32 clear of indicating signal flag 35 freeing it for rotation by torsion spring 36. A shock vector applied perpendicular to base 11 moves base 11 away from seismic mass 17. If the applied shock exceeds the predetermined amount, rod portion 23 of seismic mass 13, bearing against leaf spring 32, increases the clearance between leaf spring 32 and base 11, releasing indicating signal flag 35. Clearly, a shock vector exceeding a predetermined amount anywhere in the hemisphere surrounding mass 17 serves to trip indicating signal flag 35. Termination of the shock allows leaf spring 32 to urge mass 17 back into seating aperture 24. Stop 33 is spaced from base 11 by a distance short enough to prevent small cylinder portion 22 of mass 17 from leaving seating aperture 24, therefore preventing mass 17 from escaping, as does the seismic mass in the embodiment of FIGURES 1 and 2.

Figure 7:
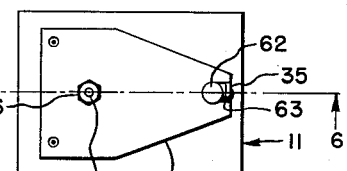
FIGURE 7 is a top view of the embodiment of FIGURE 6.
Figure 6:
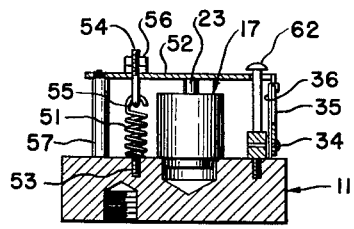
FIGURE 6 is a cross-sectional view of a third embodiment of this invention taken along 6—6 in FIGURE 7.
Figure 8:
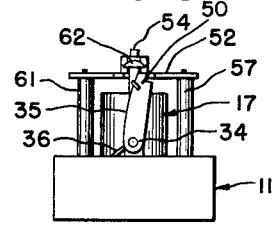
FIGURE 8 is an end view of the embodiment of FIGURE 6.

Another embodiment of this invention is illustrated in FIGURES 6, 7 and 8. Base 11, seismic mass 17, indicator signal flag 35, bearing 34 and indicator plug torsion spring 36 are substantially identical to the like numbered parts in the embodiment of FIGURES 3, 4 and 5. However, instead of the leaf spring employed in the embodiment of FIGURES 3, 4 and 5, a coil spring 51, under tension, urges a restraining plate 52 towards base 11. Coil spring 51 is fastened to base 11 by screw 53 at one end, and to restraining plate 52 at the other end by means of a threaded rod 54. Rod 54 is provided with an eye or loop 55 for receiving spring 51. Tension of spring 51 may be adjusted by rotation with respect to rod 54 of a nut 56, provided with a suitable locking mechanism. Nut 56 bears against restraining plate 52.

Restraining plate 52 may be considered as a lever of the second class, with one end pivotally supported on pivot rods 57 and 61, the other end supported by rod portion 23 of seismic mass 17, and the load applied by tension spring 51 intermediate between pivot rods 57 and 61, and seismic mass 17. Motion of restraining plate 52 is limited by a headed stop post 62 fastened to base 11 and passing through an aperture 63 in restraining plate 52, smaller than the head, but large enough to clear the shaft of the stop post.

An indicator 35, substantially similar to that disclosed hereinabove in connection with FIGURES 3, 4 and 5, is journaled for rotation about a pin 34, fixed to the base of stop post 62. Torsion spring 36 biases indicator 35 for rotation to the right in FIGURE 8. However, the notch 50 in the indicator 35 is normally obstructed by restraining plate 52. Upon application of a shock acceleration having a vector component in the hemisphere above base 11, seismic mass 17 rotates restraining plate 52 about a line joining pivot rods 57 and 61 against the force exerted by tension spring 51, raising the end of restraining plate 52 adjacent indicating signal flag 35. If the shock acceleration exceeds an amount predetermined by the mass and center of gravity of seismic mass 17, the tension of spring 51 and the lever arms of restraining plate 52, the end of restraining plate 52 lifts clear of the notch in signal flag 35, allowing torsion spring 36 to rotate signal flag 35 about journal 34 to a position substantially parallel to the plane of base 11.

Another embodiment of this invention which is sensitive to shock acceleration vectors in any direction is illustrated in FIGURES 9, 10 and 11. Instead of the flat base 11 employed in the embodiments disclosed hereinabove, a rectangular prism base 60 is employed to maintain the components in operating relationship. Base 60 is supported and enclosed by a cup-shaped container 64, being fastened thereto by a threaded stud 65 secured by a mating nut 66. An internally threaded fastener 67, welded or otherwise secured to the container 64, is provided to enable fastening the shock indicator of FIGURES 9, 10 and 11 to the shipment to be monitored.

Base 60 is provided with a first aperture 71 adapted to receive substantially cylindrical seismic masses 72 and 73, and with a second aperture 74 adapted to receive a coil spring 75. First aperture 71 is provided with a seat for seismic masses 72 and 73, comprising a reduced diameter portion 76. Seismic masses 72 and 73 are furnished with integral flanges 77 and 81, respectively, adapted to seat on the shelf provided by reduced diameter portion 76 of aperture 71.

Seismic masses 72 and 73 are retained in seated position in aperture 71 by restraining plates 82 and 83, respectively. Restraining plates 82 and 83 are journaled for rotation about pins 84 and 85, fixed to base 60. Coil spring 75 is held under tension between restraining plates 82 and 83 by U shaped clips 86 and 87, retaining restraining plates 82 and 83 against seismic masses 72 and 73.

A first indicator signal flag 91 cooperates with seismic mass 72 and restraining plate 82, and a second indicator signal flag 92 cooperates with seismic mass 73 and restraining plate 83. Indicator signal flags 91 and 92 are journaled for rotation about headed stud 93 fixed to one end of base 60 at the center of one side. Indicators 91 and 92, fabricated of a suitable light sheet material, are furnished with upraised portions 94 and 95, respectively. Torsion springs 96 and 97, cooperating with signals 91 and 92, respectively, urge signals 91 and 92 into visible, shock indicating position.

A cover 101, fabricated of a suitable transparent material, preferably a transparent synthetic plastic such as methyl methacrylate, is suitably fastened, as by nut 99 and stud 100, to container 64. A gasket 102 provides a seal between cover 101 and container 64, keeping out dust, moisture, etc. Cover 101 is covered with an opaque coating 103, as by painting, except for uncoated transparent window portions 104 and 105. Coating 103 normally obscures indicating signals 91 and 92 from view.

Upon application of a shock acceleration above the level predetermined by the mass and center of gravity of seismic masses 72 and 73, the radii of flanges 77 and 81, and the restraining force exerted by spring 75 through the lever arm of restraining plates 82 and 87, the appropriate mass will tilt on, or lift from, the shelf provided by reduced diameter portion 76 of aperture 71, depending upon the direction of the shock vector. If the shock vector is applied in the upper hemisphere, the movement of seismic mass 72 rotates restraining plate 82 about pin 84, freeing the end of indicating signal 91 and allowing torsion spring 96 to rotate indicating signal 91 about bearing 93 into visibility through transparent window portion 104 of cover 101. A shock vector applied in the lower hemisphere similarly enables rotation of indicating signal 92 to the transparent window portion 105 of cover 101. Indicating signals 91 and 92 may be reset by removing cover 101 and rotating the signals back to the latched position.

Another embodiment of this invention, suitable for indicating excessive shock in one hemisphere only, is illustrated in FIGURES 12, 13 and 14. In this embodiment of the present invention, a hollow cylindrical base 106 is provided with a flange 107. A container 111, having one end open, encloses base 106. A recess at the open end of container 111 is provided to accommodate flange 107. Cylindrical seismic mass 112 is provided with an integral flange 113 adapted to seat on the end of base 106 opposite flange 107.

A bridge 114, having each end supported in a cooperating aperture in base 106, supports one end of a coil spring 115. A strut 116, having a slot in one end enclosing bridge 114, is constrained thereby to freely slide up and down with respect to bridge 114, and is fastened to coil spring 115 at the end opposite bridge 114. An end clip 117 links strut 116 and coil spring 115, held under tension, to seismic mass 112. Strut 116 is supported in the center of coil spring 115, both being centrally located in the center of the hollow interior of cylindrical seismic mass 112. Flange 113 of seismic mass 112 is urged against base 106 by the tension of coil spring 115, seating flange 113 on base 106.

An indicating signal cylinder 121 is fastened to an axis 122, journaled in suitable apertures provided in base 106 adjacent flange 107. Indicating signal cylinder 121 is provided with a triangular stop 123. A torsion spring 124 urges rotation of cylinder 121 in the counter-clockwise direction, as illustrated in FIGURE 12. However, stop 123 normally abuts against the end of strut 116, preventing rotation of cylinder 121.

A cover 125, fabricated of a suitable transparent material such as a methyl methacrylate plastic, is fastened to container 111 by machine screws 126, 127, 131, and 132. Tapped apertures in container 111 receive screws 126, 127, 131 and 132, which also pass through apertures in flange 107 of base 106 and through a sealing gasket 133. Cover 125 is furnished with a stepped, cylindrical, partially cut away portion 134. This step discontinuity forms a stop 135, cooperating with triangular stop 123 on cylindrical signal 121. The underside of cover 125 is covered with an opaque coating 136, as by painting, except for transparent window portion 134, exposing signal 121 to view. The normally visible portion of signal 121 may be colored green, and the portion visible after rotating upon being tripped may conveniently be colored red, indicating shock application greater than the predetermined amount.

The shock amplitude required to trip the embodiment of FIGURES 12, 13 and 14 is determined by the radius of flange 113, the position of the center of gravity of mass 112 with respect to flange 113, the mass of seismic mass 112, and the force exerted by spring 115. Container 111, fastened to the shipment, crate, etc. by a bolt screwed into tapped aperture 137, is sensitive to shock vectors applied in the hemisphere opposite cover 125.

Upon application of a shock greater than the predetermined value, mass 112 tilts about flange 113 and base 106 in response to a side shock vector, or lifts flange 113 from base 106 in response to an end shock vector. Tilting or lifting of mass 112 withdraws strut 116 from stop 123, allowing torsion spring 124 to rotate indicating signal 121 counterclockwise until signal stop 123 abuts cover stop 135, exposing the red portion of indicating signal 121. Indicating signal 121 may be reset by removing threaded plug 141 from aperture 142 in container 111, inserting a screwdriver-like blade in a suitable slot 120 provided in shaft 122, and rotating shaft 122 clockwise until signal stop 123 is caught by strut 116.

Further modifications will occur to those skilled in the art and all such are considered to fall within the spirit and scope of this invention as defined in the appended claims.

What I claim is:

1. A shock indicator comprising a hollow base member, a cylindrical seismic mass having flange means peripherally seated in said hollow base member, resilient means for normally retaining the flange of said seismic mass in peripherally seated relation with said base member, and means for indicating unseating of said seismic mass upon application of excess shock.

2. A shock indicator comprising a hollow base member, a cylindrical seismic mass having flange means adapted to seat on said base member, resilient means for normally retaining the periphery of said flange in seated relation on said base member, and means for indicating unseating of said seismic mass from said base member upon application of excess shock.

3. A shock indicator comprising an apertured base member, a cylindrical seismic mass having flange means adapted to seat on said base member and having a bearing surface, resilient means applying a force to said bearing surface for normally retaining said seismic mass in seated relation with said base member, and means for indicating unseating of said seismic mass from said base member upon application of excess shock.

4. A shock indicator comprising an apertured base member, a cylindrical seismic mass having flange means adjacent one end adapted to seat on said base member and having a bearing surface at the end opposite said flange, resilient means applying a force to said bearing surface for normally retaining said seismic mass in seated relation with said base member, and means for indicating unseating of said seismic mass from said base member upon application of excess shock.

5. A shock indicator comprising an apertured base member, a cylindrical seismic mass having a reduced diameter portion at one end adapted to seat on said base member, and having a bearing surface at the end opposite said reduced diameter portion, resilient means applying a force to said bearing surface for normally retaining said seismic mass in seated relation with said base member, and means for indicating unseating of said seismic mass from said base member upon application of excess shock.

6. A shock indicator comprising an apertured base member, a cylindrical seismic mass having a reduced diameter portion adjacent one end adapted to seat on said base member, and having a bearing surface at the end opposite said reduced diameter portion, resilient means connected to said base member applying a force to said bearing surface for normally retaining said seismic mass in seated relation with said base member, and means for indicating unseating of said seismic mass from said base member upon application of excess shock.

7. A shock indicator comprising an apertured base member, a cylindrical seismic mass having flange means adjacent one end adapted to seat on said base member, and having a bearing surface at the end opposite said flange, resilient means connected to said base member applying a force to said bearing surface for normally retaining said seismic mass in seated relation with said base member, and indicating means for indicating unseating of said seismic mass from said base member upon application of excess shock.

8. A shock indicator comprising an apertured base member, a cylindrical seismic mass having flange means adjacent one end adapted to seat on said base member, and having a bearing surface at the end opposite said flange, a spring connected to said base member applying a force to said bearing surface for normally retaining said seismic mass in seated relation with said base member, retaining means connected to said base member for limiting deflection of said spring and enable return of said seismic mass to seating relationship with said base member, and indicating means for indicating unseating of said seismic mass from said base member upon application of excess shock.

9. A shock indicator comprising an apertured base member, a cylindrical seismic mass having a reduced diameter portion at one end adapted to seat on said base member, and having a bearing surface at the end opposite said reduced diameter portion, a spring connected to said base member applying a force to said bearing surface for normally retaining said seismic mass in seated relation with said base member, retaining means connected to said base member adapted to limit deflection of said spring and enable return of said seismic mass to seating relationship with said base member, and visual indicating means for indicating unseating of said seismic mass from said base member upon application of excess shock.

10. A shock indicator comprising an apertured base member, a cylindrical seismic mass having a reduced diameter portion at one end adapted to seat on said base member, and having a bearing surface at the end opposite said reduced diameter portion, a cantilever spring connected to said base member applying a force to said bearing surface for normally retaining said seismic mass in seated relation with said base member, retaining means connected to said base member adapted to limit deflection of said spring and enable return of said seismic mass to seating relationship with said base member, and visual indicating means for indicating unseating of said seismic mass from said base member upon application of excess shock, said indicating means including a rotatable flag, resilient means urging said flag toward said base member, and latching means adjacent said spring restraining said flag from rotation and enabling rotation upon deflection of said spring by unseating of said seismic mass.

11. A shock indicator comprising an apertured base member, a cylindrical seismic mass having flange means adapted to seat on said base member at one end, and having a bearing surface at the end opposite said reduced diameter portion, a restraining plate, a tension spring connected to said base member and to said restraining plate for applying a force to said bearing surface for normally retaining said seismic mass in seated relation with said base member, retaining means connected to said base member adapted to limit deflection of said restraining plate and enable return of said seismic mass to seating relationship with said base member, and visual indicating means for indicating unseating of said seismic mass from said base member upon application of excess shock.

12. A shock indicator comprising an apertured base member, a cylindrical seismic mass having a reduced diameter portion at one end adapted to seat on said base member, and having a bearing surface at the end opposite said reduced diameter portion, a restraining plate, a tension spring connected to said base member and to said restraining plate for applying a force to said bearing surface to normally retain said seismic mass in seated relation with said base member, retaining means connected to said base member adapted to limit deflection of said restraining plate and enable return of said seismic mass to seating relationship with said base member, and visual indicating means for indicating unseating of said seismic mass from said base member upon application of excess shock, said indicating means including a rotatable flag, spring means urging said flag toward said base member, and latching means on said restraining plate restraining said flag from rotation and enabling rotation upon deflection of said restraining plate by unseating of said seismic mass.

13. A shock indicator comprising an apertured base member, a cylindrical seismic mass having a reduced diameter portion at one end adapted to seat on said base member, and having a bearing surface at the end opposite said reduced diameter portion, journaling means connected to said base member, a restraining plate connected to said journaling means, a tension spring connected to said base member and to said restraining plate for applying a force to said bearing surface to normally retain said seismic mass in seated relation with said base member, stop means connected to said base member adapted to limit deflection of said restraining plate and enable return of said seismic mass to seating relationship with said base member, and visual indicating means for indicating unseating of said seismic mass from said base member upon application of excess shock, said indicating means including a rotatable flag, spring means urging said flag toward said base member, and latching means on said restraining plate restraining said flag from rotation and allowing rotation upon deflection of said restraining plate by unseating of said seismic mass.

14. A shock indicator comprising a base member having an aperture and a shelf within said aperture, a cylindrical seismic mass having a flange at one end adapted to seat on said shelf, and having a bearing surface at the end opposite said flange, a restraining plate journalled to said base member, a spring urging said restraining plate toward said bearing surface for normally retaining said seismic mass in seated relation with said base member, retaining means connected to said base member adapted to limit deflection of said restraining plate and enable return of said seismic mass to seating relationship with said base member after motion of said seismic mass due to shock, and visual indicating means for indicating unseating of said seismic mass from said base member upon application of excess shock.

15. A shock indicator comprising a base member having an aperture and opposing first and second shelves with said aperture, first and second cylindrical seismic masses, each of said seismic masses having a flange at one end adapted to seat on said shelves, and having a bearing surface at the end opposite said flange, first and second opposed restraining plates journalled to said base member, a spring urging said first and second restraining plates toward one another, said restraining plates contacting said bearing surfaces for normally retaining said seismic masses in seated relation with said base member, retaining means adapted to limit deflection of said restraining plates and enable return of said seismic masses to seating relationship with said base member after motion of said seismic masses due to shock, and first and second visual indicating means for indicating unseating of said first and second seismic masses, respectively, from said base member upon application of excess shock.

16. A shock indicator comprising a base member having an aperture and opposing first and second shelves within said aperture, first and second cylindrical seismic masses, each of said seismic masses having a flange at one end adapted to seat on said first and second shelves, respectively, and having a bearing surface at the end opposite said flange, first and second opposed restraining plates journalled to said base member, a spring urging said first and second restraining plates toward one another, said restraining plates contacting said bearing surfaces for normally retaining said seismic masses in seated relation with said base member, retaining means adapted to limit deflection of said restraining plates and enable return of said seismic masses to seating relationship with said base member after motion of said seismic masses due to shock, first and second visual indicating means for indicating unseating of said first and second seismic masses, respectively, from said base member upon application of excess shock, each of said first and second visual indicating means including a rotatable flag, spring means urging said flag toward a shock-indicating position, and latching means on the associated restraining plate preventing rotation of said flag and allowing rotation of said flag to a shock-indicating position by unseating of the associated seismic mass.

17. A shock indicator comprising a hollow, cylindrical base member, a hollow cylindrical seismic mass having a flange adapted to seat on said base member, a bridge connected to said base member, a clip connected to said seismic mass, a restraining plate joining said bridge and said clip, a spring connected to said bridge and said restraining plate urging said seismic mass toward said base member for normally retaining said seismic mass in seated relation with said base member and enabling return of said seismic mass to seating relationship with said base member after motion of said seismic mass due to shock, and visual indicating means for indicating unseating of said seismic mass from said base member upon application of excess shock.

18. A shock indicator comprising a hollow, cylindrical base member, a hollow cylindrical seismic mass having a flange adapted to seat on said base member, a bridge connected to said base member, a clip connected to said seismic mass, a restraining plate joining said bridge and said clip, and moveable with respect to said bridge, a spring connected to said bridge and said restraining plate urging said seismic mass toward said base member for normally retaining said seismic mass in seated relation with said base member and enabling return of said seismic mass to seating relationship with said base member after motion of said seismic mass due to shock, and visual indicating means for indicating unseating of said seismic mass from said base member upon application of excess shock, said indicating means including a rotatable signal having a stop abutting said restraining plate, a spring urging rotation of said signal toward a shock indicating position, said restraining plate allowing rotation of said signal to a shock indicating position upon unseating of said seismic mass.

19. A shock indicator comprising a hollow, cylindrical base member, a hollow cylindrical seismic mass having a flange adapted to seat on said base member, a bridge connected to said base member, a clip connected to said seismic mass, a restraining plate joining said bridge and said clip and slidingly moveable with respect to said bridge, a spring connected to said bridge and said restraining plate urging said seismic mass toward said base member for normally retaining said seismic mass in seated relation with said base member and enabling return of said seismic mass to seating relationship with said base member after motion of said seismic mass due to shock, and visual indicating means for indicating unseating of said seismic mass from said base member upon application of excess shock including a rotatable signal having a stop abutting said restraining plate, and a spring urging rotation of said signal toward a shock indicating position upon withdrawal of said restraining plate from said stop as said seismic mass is unseated by shock.

20. A shock indicator comprising a container, an apertured base member secured to said container, a seismic mass adapted to seat on said base member, a spring mounted within said seismic mass urging said seismic mass into seating relation with said base member, indicating means having a normal position and a shock indicating position, resilient means urging said indicating means toward said shock indicating position, and restraining means connected to said seismic mass for retaining said indicating means in said normal position and releasing said indicating means upon unseating of said seismic mass from said base member.

21. A shock indicator comprising a container, an apertured base member secured to said container, a hollow seismic mass adapted to seat on said base member, first resilient means mounted within said seismic mass urging said seismic mass into seating relation with said base member, indicating means having a normal position and a shock indicating position, second resilient means urging said indicating means toward said shock indicating position, and restraining means connected to said seismic mass for retaining said indicating means in said normal position and releasing said indicating means to said shock indicating position upon unseating of said seismic mass from said base member by a shock.

22. A shock indicator comprising a container, an apertured base member secured to said container, a hollow seismic mass adapted to seat on said base member, a spring mounted within said seismic mass urging said seismic mass into seating relation with said base member, indicating means having a normal position and a shock indicating position, a spring urging said indicating means toward said shock indicating position, and restraining means connected to said seismic mass for retaining said indicating means in said normal position and releasing said indicating means upon unseating of said seismic mass from said base member.

23. A shock indicator comprising a container, an apertured base member secured to said container, a hollow, cylindrical seismic mass adapted to seat on said base member, a coil spring mounted within said seismic mass urging said seismic mass into seating relation with said base member, indicating means having a normal position and a shock indicating position, a spring urging said indicating means toward said shock indicating position, and restraining means connected to said seismic mass for retaining said indicating means in said normal position and releasing said indicating means to said shock indicating position upon unseating of said seismic mass from said base member by a shock.

References Cited in the file of this patent

UNITED STATES PATENTS 2,679,819    Torcheux _____ June 1, 1954

FOREIGN PATENTS 652,077    Great Britain _____ Apr. 18, 1951